(12) United States Patent
Nakajima et al.

(10) Patent No.: US 11,536,130 B2
(45) Date of Patent: Dec. 27, 2022

(54) LOGGING WHILE DRILLING (LWD) MECHANICAL CALIPERS

(71) Applicant: Schlumberger Technology Corporation, Sugar Land, TX (US)

(72) Inventors: Hiroshi Nakajima, Sugar Land, TX (US); Cong Wang, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 757 days.

(21) Appl. No.: 16/432,999

(22) Filed: Jun. 6, 2019

(65) Prior Publication Data

US 2019/0376381 A1 Dec. 12, 2019

Related U.S. Application Data

(60) Provisional application No. 62/681,118, filed on Jun. 6, 2018.

(51) Int. Cl.
*E21B 47/08* (2012.01)
*E21B 47/01* (2012.01)
*E21B 47/12* (2012.01)

(52) U.S. Cl.
CPC .............. *E21B 47/08* (2013.01); *E21B 47/01* (2013.01); *E21B 47/12* (2013.01); *G01V 2200/16* (2013.01)

(58) Field of Classification Search
None
See application file for complete search history.

(56) References Cited

U.S. PATENT DOCUMENTS

2010/0319991 A1* 12/2010 Brannigan .............. E21B 47/08
175/40
2017/0115423 A1 4/2017 Hori
2018/0016887 A1* 1/2018 Thompson .............. E21B 47/01

FOREIGN PATENT DOCUMENTS

EP 2920406 B1 * 1/2018 ......... E21B 17/1021
WO WO-2011050061 A2 * 4/2011 ............. E21B 10/62

OTHER PUBLICATIONS

Substantive Exam issued in Saudi Arabian Patent Application No. 119400785 dated Sep. 26, 2022, 29 pages with English translation.

* cited by examiner

*Primary Examiner* — Curtis A Kuntz
*Assistant Examiner* — Jerold B Murphy (57) ABSTRACT

Logging while drilling (LWD) mechanical calipers are disclosed. An example apparatus to characterize a bore includes a drill collar, a sliding sleeve that moves longitudinally relative to the drill collar, and a sliding block operatively coupled to the sliding sleeve and movable relative to the drill collar. The example apparatus also includes a caliper arm operatively coupled to the sliding block, where the caliper arm is to displace radially outward towards an inner diameter of the bore based on movement of the sliding block, and a caliper sliding sensor to measure a movement of the sliding block.

20 Claims, 11 Drawing Sheets

LOGGING WHILE DRILLING (LWD) MECHANICAL CALIPERS

RELATED APPLICATION

This patent claims priority to and the benefit of U.S. Provisional Patent Application Ser. No. 62/681,118, which was filed on Jun. 6, 2018. U.S. Provisional Patent Application Ser. No. 62/681,118 is hereby incorporated herein by reference in its entirety.

FIELD OF THE DISCLOSURE

This disclosure relates generally to bore drilling and, more particularly, to logging while drilling (LWD) mechanical calipers.

BACKGROUND

Logging while drilling (LWD) calipers are typically used to measure borehole diameters corresponding to bore drilling operations. In particular, such calipers can be used to measure and/or estimate cement volume needed, completion implementation optimization, borehole stability, geomechanics analysis and measurement calibration. Known LWD ultrasonic pulse echo calipers have a limited measurable distance. Further, known LWD density, electromagnetic or sonic calipers have relatively low azimuthal resolutions.

Alternatively, known wireline (WL) calipers can only be operated after a drilling operation, which can necessitate additional rig time and, thus, costs. Moreover, use of these known WL calipers can result in hole condition degradation during logging as well as an increased risk of being stuck.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Logging while drilling (LWD) mechanical calipers are disclosed. Known bore calipers in drilling operations can be limited in functionality. In particular, known calipers can have limited measuring or diameter size ranges. Further, some known calipers can have limited azimuthal resolution to characterize borehole shapes and/or sizes. Moreover, some known measurement systems employ calculations with multiple measured radii to define an ellipse. However, these calculations can be relatively inaccurate.

Examples disclosed herein provide an accurate and cost-effective manner of measuring and/or characterizing bore characteristics, such as diameter and/or overall shape properties. In particular, examples disclosed herein can enable relatively high azimuthal resolution as well as relatively high accuracy bore measurements (e.g., within 0.1 inches).

Examples disclosed herein utilize a movable sleeve in which movement of the sleeve relative to a drill collar causes a caliper arm to open. In particular, the movable sleeve slides relative to the drill collar, thereby causing outward movement of the caliper arm towards an inner diameter of a bore. Accordingly, caliper data can be recorded (e.g. via a recording device) while drill pipes are retrieved.

In some examples, the movable sleeve is moved when a lock latch (e.g., a cam-operated lock or latch) holding the sleeve is released. In such examples, the lock or latch is released when a drop ball or other object displaces the movable sleeve against a force provided by a coil spring. In some examples, bore diameters are measured while drill pipes are retrieved from corresponding bores. In some examples, the caliper arm is implemented as a bow spring.

Figure 1:
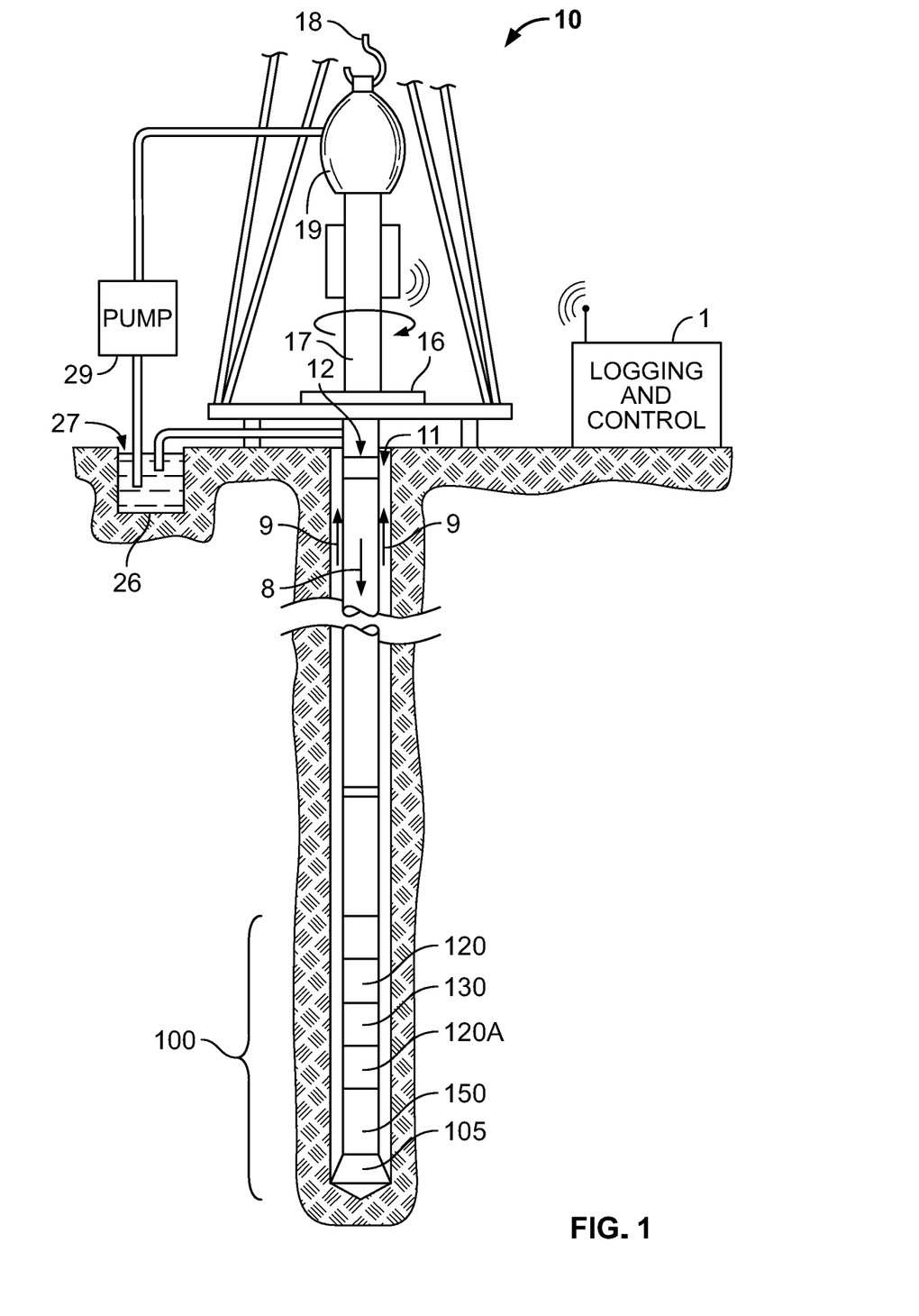
FIG. 1 illustrates a wellsite system in which the examples disclosed herein can be employed.

FIG. 1 illustrates a wellsite system in which the examples disclosed herein can be implemented. The wellsite can be onshore or offshore. In this example system, a borehole 11 is formed in subsurface formations by rotary drilling while a logging and control (e.g., a data transmittal system) 1 obtains and transmits data pertaining to the example well site system. However, examples disclosed herein can also use directional drilling.

A drill string 12 is suspended within the borehole 11 and has a bottom hole assembly 100 that includes a drill bit 105 at its lower end. The surface system includes a platform and derrick assembly 10 positioned over the borehole 11. The assembly 10 includes a rotary table 16, a kelly 17, a hook 18 and a rotary swivel 19. The drill string 12 is rotated by the rotary table 16. The rotatory table 16 may be energized by a device or system not shown. The rotary table 16 may engage the kelly 17 at the upper end of the drill string 12. The drill string 12 is suspended from the hook 18, which is attached to a traveling block (also not shown). Additionally, the drill string 12 is positioned through the kelly 17 and the rotary swivel 19, which permits rotation of the drill string 12 relative to the hook 18.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as generally indicated by the directional arrows 9. Accordingly, the drilling fluid 26 lubricates the drill bit 105 and carries formation cuttings up to the surface as it is returned to the pit 27 for recirculation.

The bottom hole assembly 100 of the example illustrated in FIG. 1 includes a logging-while-drilling (LWD) module 120, a measuring-while-drilling (MWD) module 130, a roto-steerable system and motor 150, and the aforementioned drill bit 105.

The example LWD module 120 may be housed in a particular and/or specialized type of drill collar and can contain one or more logging tools. In some examples, the bottom hole assembly 100 may include additional LWD and/or MWD modules. As such, references throughout this description to reference numeral 120 may additionally or alternatively include 120A. The LWD module 120 may include capabilities for measuring, processing, and storing information, as well as for communicating with the surface equipment. Additionally or alternatively, the LWD module 120 includes a sonic measuring device.

In this example, the MWD module 130 includes one or more of the following types of measuring devices: a weight-on-bit measuring device, a torque measuring device, a vibration measuring device, a shock measuring device, a stick slip measuring device, a direction measuring device and/or an inclination measuring device.

Although the components of FIG. 1 are shown and described as being implemented in a particular conveyance type, examples disclosed herein are not limited to a particular conveyance type but, instead, may be implemented in connection with different conveyance types including, for example, coiled tubing, wireline wired drill pipe and/or any other conveyance types known in the industry.

Figure 2:
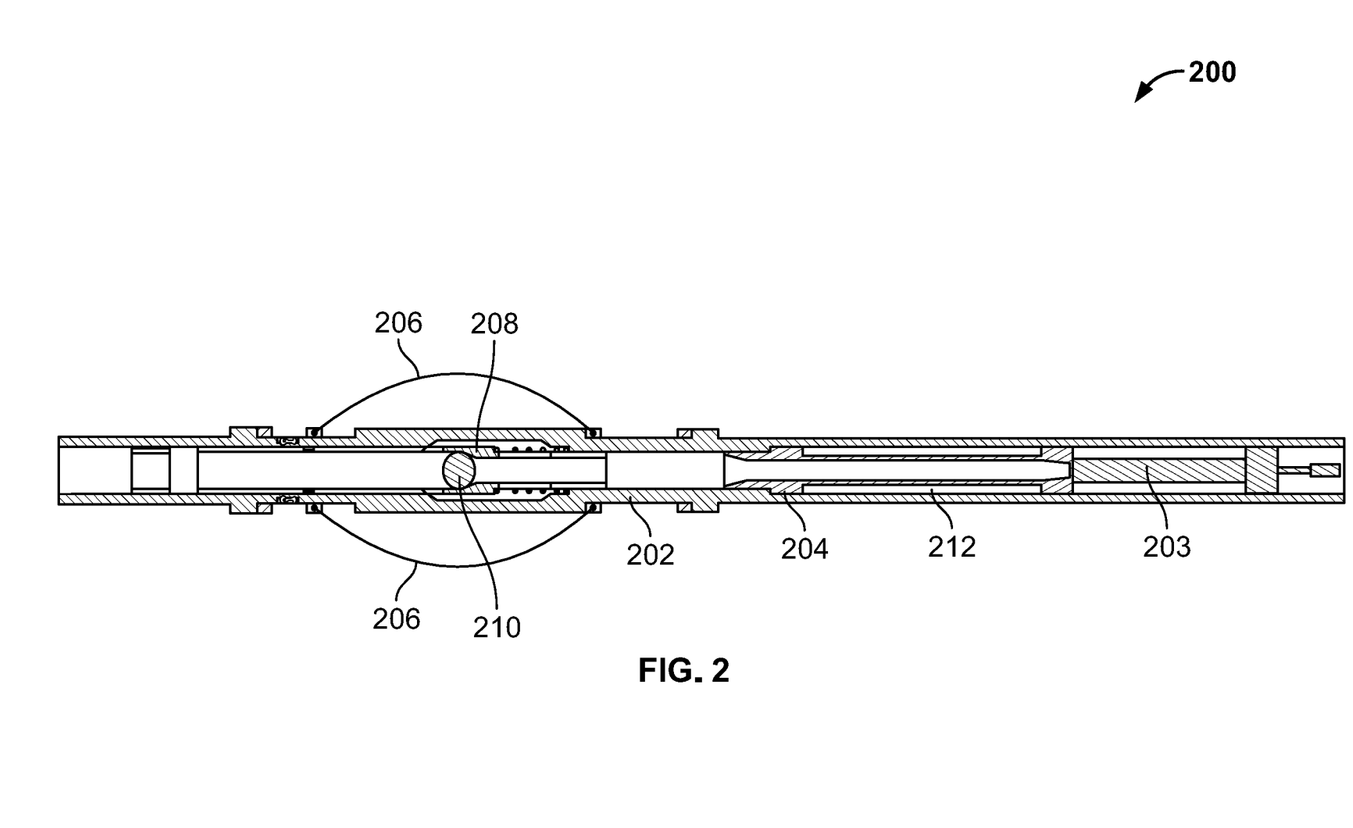
FIG. 2 is a cross-sectional view of an example mechanical caliper in accordance with teachings of this disclosure.

FIG. 2 is a cross-sectional view of an example mechanical caliper 200 in accordance with the teachings of this disclosure. The mechanical caliper 200 of the illustrated example includes a drill collar 202, a battery housing 203, an electronics chassis 204, caliper arms 206, both of which are implemented as bow springs in this example, a sliding sleeve 208 and a drop ball 210. In some examples, the mechanical caliper 200 includes electronics 212 (e.g., storage and/or calculation processing, etc.).

To measure a diameter and/or shape profile of the borehole 11, the mechanical caliper 200 can be placed into the borehole 11 shown in FIG. 1. As will be described in further detail below, the mechanical caliper 200 obtains bore diameter measurements based on the caliper arms 206 being moved diametrically outwards resulting from displacement of the sliding sleeve 208 via the drop ball 210. In the view of FIG. 2, the caliper arms 206 are shown expanded diametrically outwards towards a bore inner diameter (upwards and downwards in the view of FIG. 2).

Figure 3:
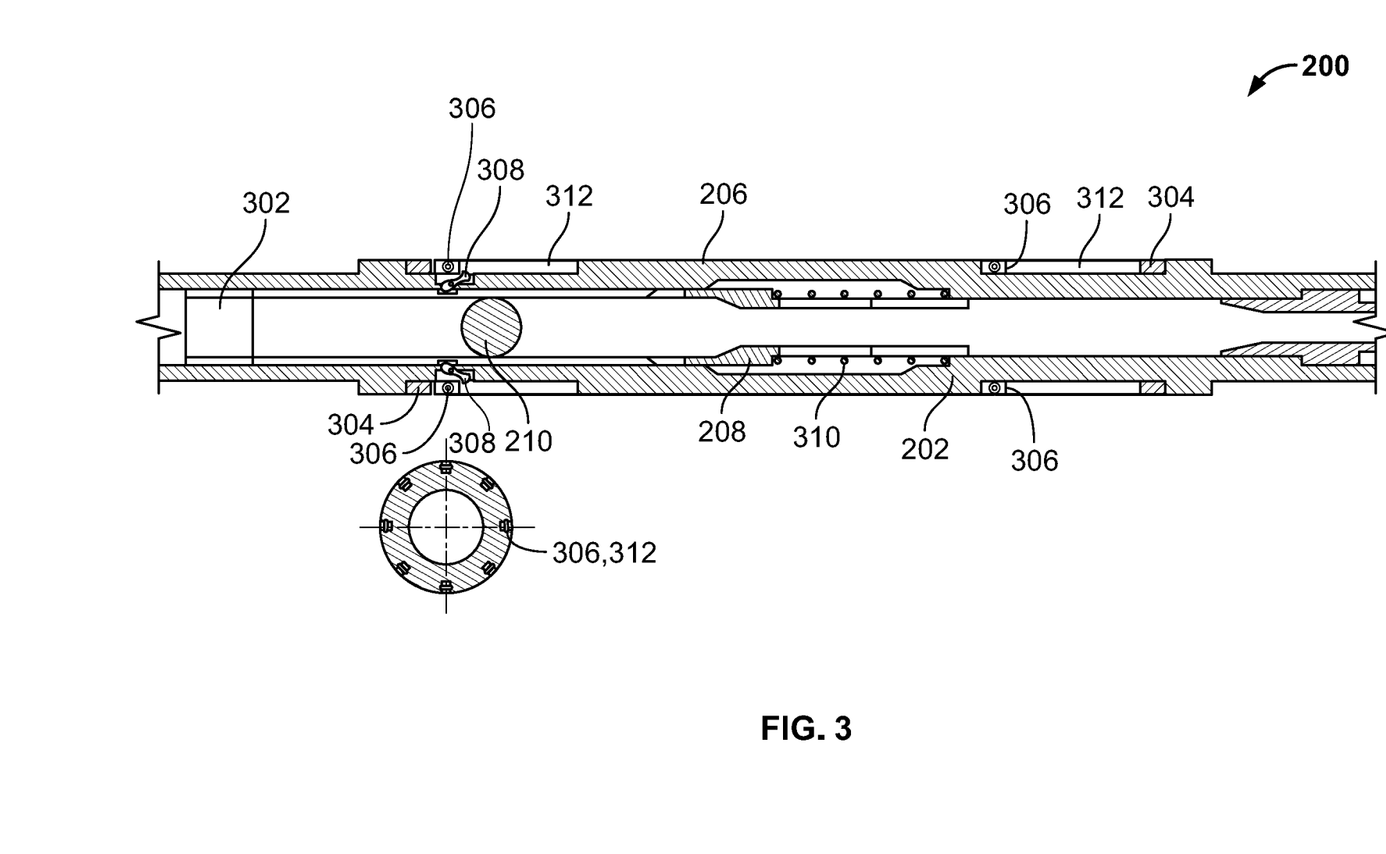
FIG. 3 is a detailed cross-sectional view of the mechanical caliper of FIG. 2.

FIG. 3 is a detailed cross-sectional view of the mechanical caliper 200 of FIG. 2 shown in a retracted state. As can be seen in the view of FIG. 3, the mechanical caliper 200 also includes a jam nut 302, caliper sliding sensors 304, caliper sliding blocks 306, latches (e.g., locks, cam-operated latches or locks, etc.) 308 and a push spring 310. In this example, the push spring 310 is shown disposed between the sliding sleeve 208 and the drill collar 202. The example caliper arms 206 are depicted in their undeployed respective positions in FIG. 3 because the drop ball 210 has not yet displaced the sliding sleeve 208.

In this example, the sliding sleeve 208 exhibits a wider portion towards the jam nut 302 and a narrower portion that is disposed within the push spring 310. Further, the sliding blocks 306 move (e.g., linearly move) within respective indentations (e.g., grooves, tracks, linear tracks, etc.) 312. In this example, the caliper sliding sensors 304 are disposed proximate the indentations 312. Further, the sliding blocks 306 are attached to opposing distal ends of their respective caliper arms 206 in this example.

In operation, the drop ball 210 is caused to move towards the narrower portion of the sliding sleeve 208. In particular, the drop ball 210 can be caused to move by gravity or force from a moving fluid (e.g., mud). Upon contact of the drop ball 210 with narrower portion of the sliding sleeve 208, the sliding sleeve 208 displaces relative to the drill collar 202 and against a force of the push spring 310. In turn, the movement of the sliding sleeve 208 causes the latches 308 to release and allow movement of the respective sliding blocks 306, thereby enabling movement of the caliper arms 206. Accordingly, the caliper arms 206 expand diametrically outward toward an inner wall of a bore. In this particular example, the caliper arms 206 are implemented as bow springs and, thus, are spring-loaded to expand outward from the drill collar 202. In other examples, the caliper arms are pushed against the inner wall of the bore (e.g., by springs or a compression fit). The corresponding movement (e.g., displacement, relative displacement) of the sliding blocks 306 due to the diametric expansion of the caliper arms 206 is measured by the respective caliper sliding sensors 304 to determine the diametric expansion of the caliper arms 206. In some examples, the bore is characterized as the deployed caliper arms 206 are moved along a longitudinal length of the bore. In other words, outward portions of the deployed caliper arms 206 can be slid across the longitudinal length of the bore.

In some examples, the caliper sliding sensors 304 are implemented as ultra-sonic and/or photoelectric sensors. In other examples, potentiometers or linear variable differential (LVDT) sensors are implemented. Accordingly, the caliper sliding sensors 304 can be implemented as non-contact sensors. In other examples, a different object instead of the drop ball 210 is, instead, implemented. In particular, the object may have a different geometry from that of the drop ball 210 (e.g., a rectangular profile, an ellipsoid shape, a polygonal shape, etc.). In other examples, the drop ball 210 directly contacts the latches 308 to enable movement of the sliding blocks 306.

Figure 4A:
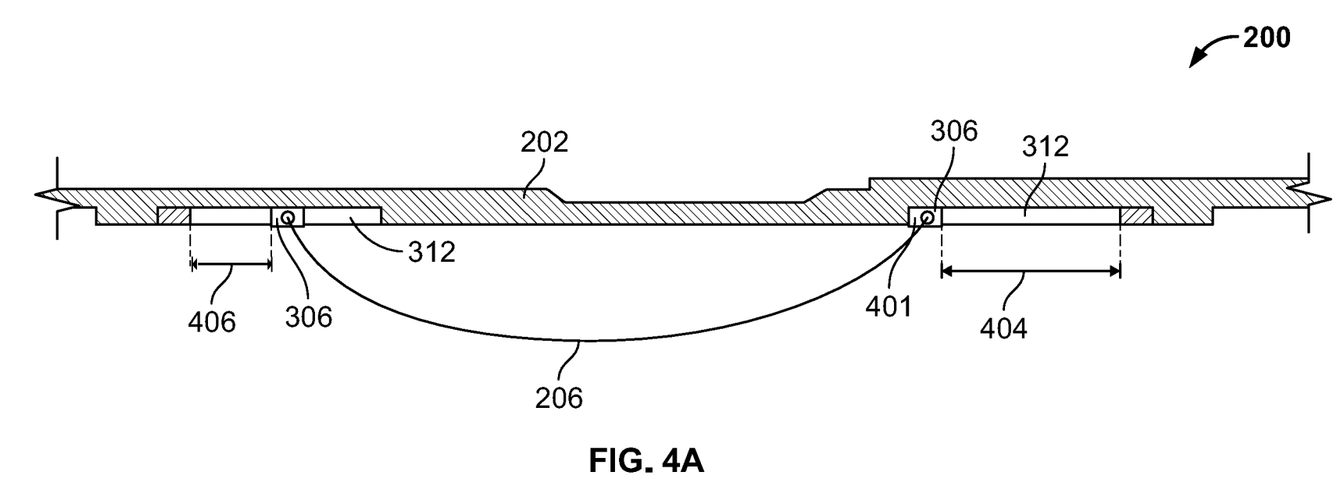
FIGS. 4A and 4B are detailed cross-sectional views depicting caliper arm movement of the mechanical caliper of FIGS. 2 and 3.
Figure 4B:
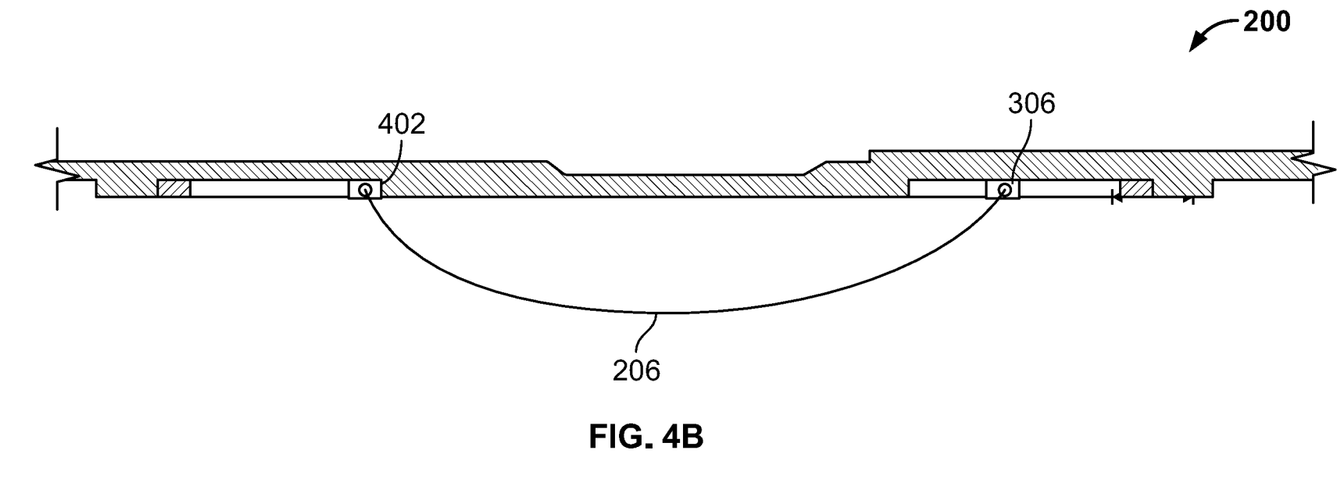

FIGS. 4A and 4B are detailed cross-sectional views depicting movement of the caliper arms 206 of the mechanical caliper 200 of FIGS. 2 and 3. In particular, FIGS. 4A and 4B depict the caliper sliding blocks 306 of the caliper arm 206 at two different positions relative to the drill sleeve 202. FIG. 4A depicts a log down contact position 401. Similarly, FIG. 4B depicts a log up contact position 402.

To calculate a diameter of a bore surrounding the example mechanical caliper 200, positions (e.g., relative displacement) of the sliding blocks 306 are measured relative to lengths or spans of the indentations 312 by the caliper sliding sensors 304 shown in FIG. 3. In particular, distances 404 and 406 depicted in FIG. 4A are summed and used in conjunction with known properties of the caliper arm 206 to determine a bore size and a depth profile. In some examples, a symmetric displacement of a geometric center of the caliper arm 206 is assumed. In other examples, an asymmetric displacement of the caliper arm 206 is accounted for.

Figure 5A:
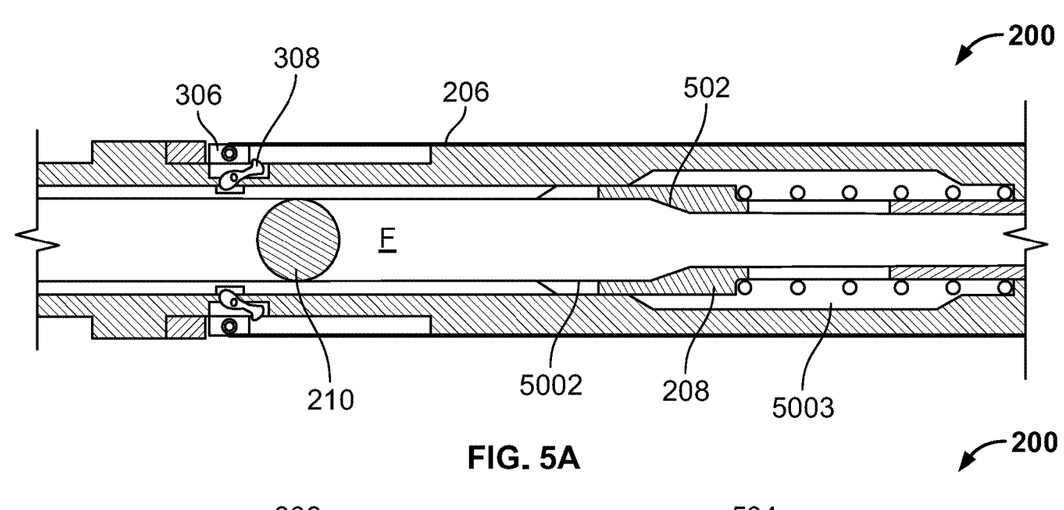
FIGS. 5A and 5B are detailed cross-sectional views depicting caliper arm locking and unlocking that can be implemented in examples disclosed herein.
Figure 5B:
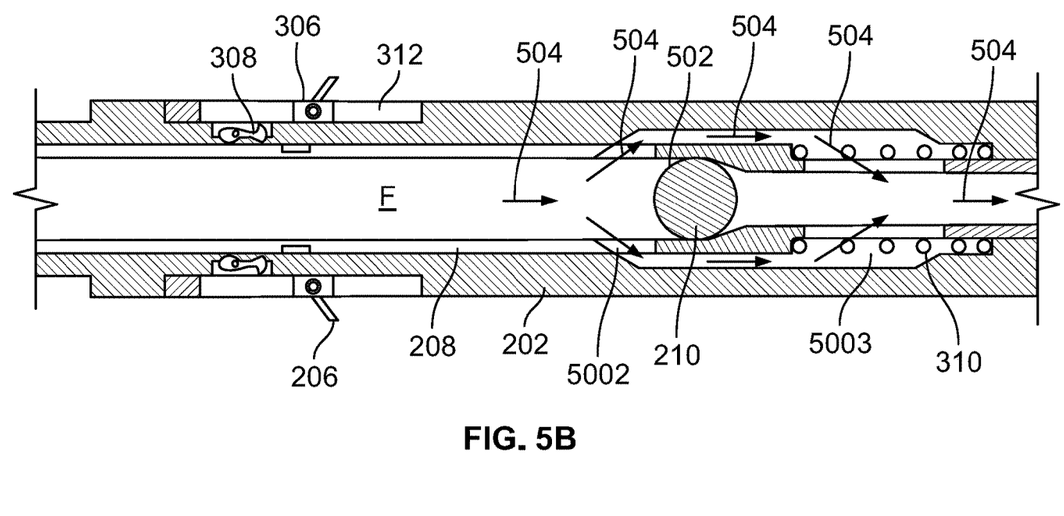

FIGS. 5A and 5B are detailed cross-sectional views depicting locking and unlocking associated with the caliper arms 206 of FIG. 2. Turning to FIG. 5A, the caliper sliding blocks 306 are shown captivated by the latches 308. In this view, the latches 308 are in their initial position and the drop ball 210 has not yet displaced the sliding sleeve 208 relative to the drill sleeve 202.

According to the illustrated example, FIG. 5B depicts the latches 308 unlocked by movement of the sliding sleeve 208, thereby enabling movement of the caliper sliding blocks 306 along the respective indentations 312. In particular, displacement of the sliding sleeve 208 relative to the drill sleeve 202 and against a force from the spring 310 is caused by movement of the drop ball 210 into a shoulder (e.g., a narrowing shoulder) 502 of the sliding sleeve 208. As a result of the drop ball 210 engaging the shoulder 502, the drop ball 210 plugs a flowline (F) in the drill sleeve 202, which results in a pressure difference between opposite sides of the drop ball 210, thereby causing the sliding sleeve 208 to move and, thus, unlock the latch 308 to allow the sliding sleeve 208 to move further. As such, when a window (e.g., an opening, an aperture, etc.) 5002 on the sliding sleeve 208 and a groove 5003 inside of the drill sleeve 202 are brought within proximity of one another, mud flowing through the drill sleeve 202 is caused to move in a direction generally indicated by arrows 504.

In some examples, a mud pump is used to move the drop ball 210 towards the shoulder 502. In some examples, the caliper arms 206 are caused to be undeployed when a mud pump is on (e.g., after the caliper arms 206 are previously deployed). Conversely, the caliper arms 206 can be deployed when the mud pump is off in some examples.

In some examples, the maximum diameter of the mechanical caliper 200 is approximately 32 inches (") and an approximately 8.25" tool is implemented. In some examples, the maximum diameter of the mechanical caliper 200 is approximately 16" and an approximately 4.75" tool is implemented therewith. However, any appropriate dimensions may be used instead based on application and/or bore dimensional requirements, etc. In some examples, four to sixteen (e.g., eight) caliper arms are implemented.

In some examples, the mechanical caliper 200 is battery powered and integrated memory is used to store measurement data (for later processing). In some examples, the mechanical caliper 200 is battery powered and integrated processor and memory are used to store processed data (for real-time data and/or compression of memory data). In some examples, the mechanical caliper 200 is communicatively coupled to an MWD system (e.g., via an LTB protocol connection). In some examples, log up and/or log down capabilities are included.

Figure 6A:
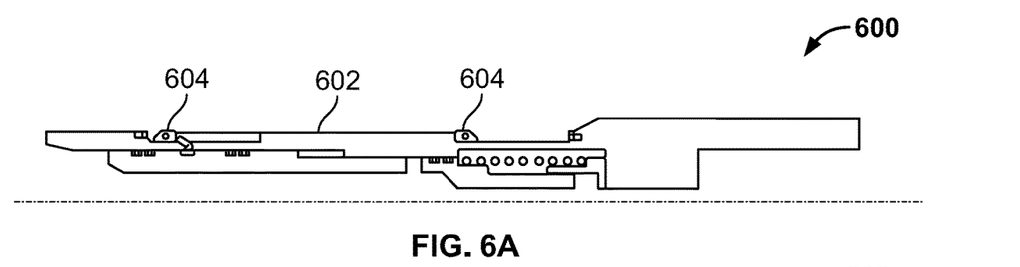
FIGS. 6A and 6B are cross-sectional views of another example mechanical caliper.
Figure 6B:
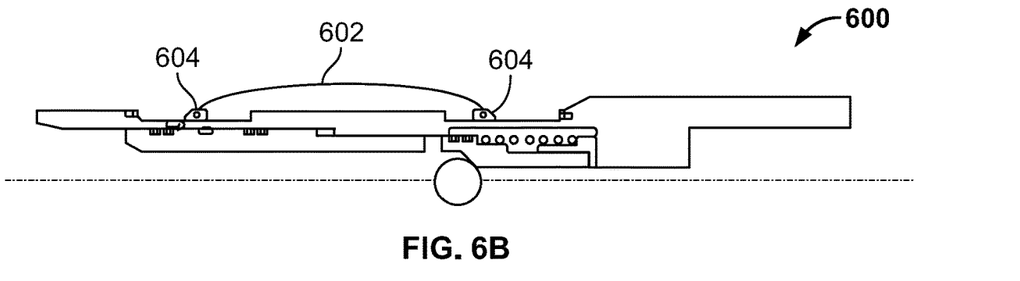

FIGS. 6A and 6B are cross-sectional views of another example mechanical caliper 600. The example of FIGS. 6A and 6B depicts an alternative locking and release mechanism in contrast to the example shown in FIGS. 2-5B. Turning to FIG. 6A, a caliper arm 602 is shown in an undeployed position. In this example, the caliper arm 602 has corresponding sliding blocks 604. FIG. 6B depicts the sliding blocks 604 displaced from respective default positions relative to the view shown in FIG. 6A, thereby causing the caliper arm 602 to displace outward.

Figure 7A:
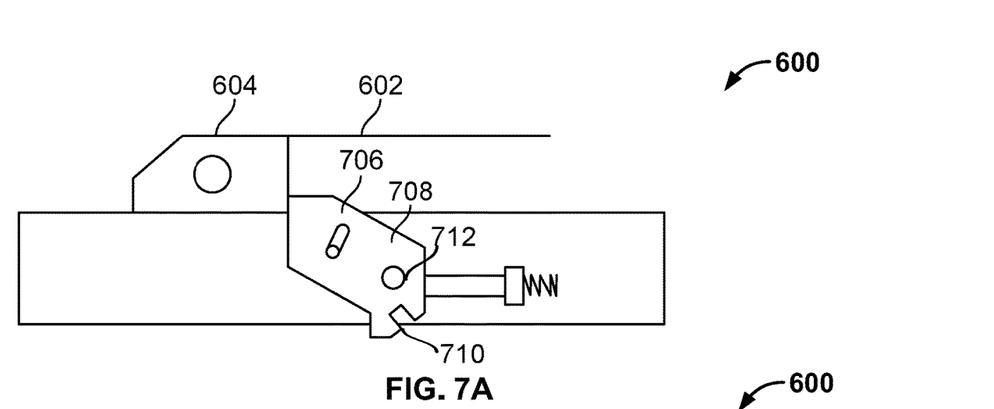
FIGS. 7A and 7B are detailed cross-sectional views of the example mechanical caliper of FIGS. 6A and 6B.
Figure 7B:
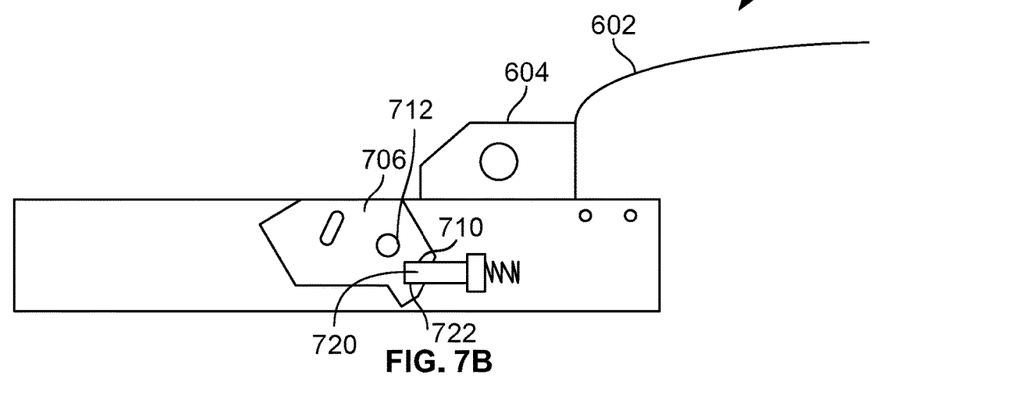

FIGS. 7A and 7B are detailed cross-sectional views the example mechanical caliper 600. According to the illustrated example of FIG. 7A, the caliper arm 602 is shown in an undeployed state. In this example, the caliper arm 602, which may be implemented as a bow spring, is coupled to the sliding block 604 which, in turn, is operatively coupled (e.g., releasably coupled) to a latch 706. The example latch 706 includes a body 708 with a notch 710 and a pivot 712.

Turning to FIG. 7B, the example mechanical caliper 600 is shown in a deployed state. In particular, the latch 706 has released the sliding block 604. In particular, the latch 706 has been released by the body 708 rotating about the pivot 712. Further, the latch 706 stays in the released position and is prevented from further movement via a holding rod (e.g., a push-pin, a spring-loaded rod, etc.) 720, thereby enabling the caliper arm 602 to deploy to expand radially along a diameter of a bore. In this example, a distal end 722 of the holding rod 720 is inserted into the notch 710 to secure the latch 706 from impeding movement of the sliding block 604.

In some examples. the caliper arm 602 is deployed when a mud pump is providing fluid to the bore even when the latch 706 releases the caliper arm 602. In some such examples, the caliper arm 602 deploys outwardly even when the aforementioned mud pump is turned off.

Figure 8:
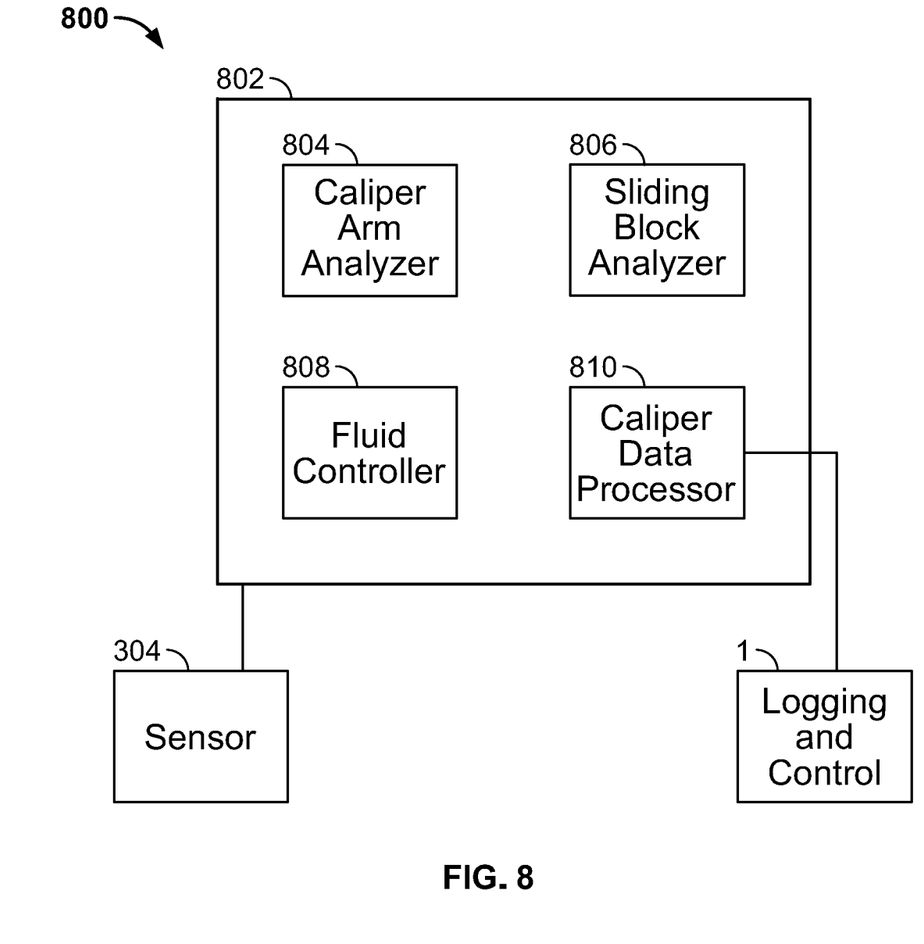
FIG. 8 is a schematic overview of an analysis system that can be implemented in examples disclosed herein.

FIG. 8 is a schematic overview of a drilling analysis system 800 that can implement examples disclosed herein. The example drilling analysis system 800 includes a bore analyzer 802, which includes a caliper arm analyzer 804, a sliding block analyzer 806, a fluid controller 808 and a caliper data processor 810. In the illustrated example, the sensor 304 and the logging control 1 are communicatively coupled to the bore analyzer 802.

According to the illustrated example, the caliper arm analyzer 804 determines a displacement and/or movement of the caliper arm 206. In particular, the example caliper arm analyzer 804 determines an amount of diametric displacement and/or movement of the caliper arm 206 based on known characteristics (e.g., arm displacement characteristics, displacement force, spring constant, moment of inertia, etc.) of the caliper arm 206. For example, the caliper arm analyzer 804 may utilize a displacement of the sliding block 306 in conjunction with the known characteristics and/or properties of the caliper arm 206 to calculate a radial displacement of the caliper arm 206 and, thus, a bore diameter. An example calculation that may be implemented in examples disclosed herein is discussed in greater detail below in connection with FIG. 12. In this example, the caliper arm analyzer 804 determines a condition of the bore, which may pertain to a bore diameter, a bore diameter profile along a longitudinal axis of the bore, or any other characteristic of the bore.

The example sliding block analyzer 806 determines and/or calculates a displacement of the sliding block 306 based on sensor data from the sensor 304. In some examples, the sliding block analyzer 806 determines a velocity, speed and/or acceleration of the sliding block 306.

In the illustrated example, the fluid controller 808 determines and/or controls an amount of fluid (e.g., mud, drilling fluid, etc.) to be provided to the bore. In some examples, the fluid controller 808 controls an amount of fluid provided to the bore based on the determined bore condition by the caliper arm analyzer 804. In some examples, the fluid controller 808 controls an amount of fluid to move the ball 210 based on a displacement of the caliper arm 206.

In this example, the caliper data processor 810 processes, filters and/or compiles information associated with the bore and transmits the information to the logging and control 1. In some examples, the caliper data processor 810 transmits a condition and/or characteristic of the bore.

While an example manner of implementing the drilling analysis system 800 of FIG. 8 is illustrated in FIG. 8, one or more of the elements, processes and/or devices illustrated in FIG. 8 may be combined, divided, re-arranged, omitted, eliminated and/or implemented in any other way. Further, the example caliper arm analyzer 804, the example sliding block analyzer 806, the example fluid controller 808, the example caliper data processor 810 and/or, more generally, the example drilling analysis system 800 of FIG. 8 may be implemented by hardware, software, firmware and/or any combination of hardware, software and/or firmware. Thus, for example, any of the example caliper arm analyzer 804, the example sliding block analyzer 806, the example fluid controller 808, the example caliper data processor 810 and/or, more generally, the example drilling analysis system 800 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, caliper arm analyzer 804, the example sliding block analyzer 806, the example fluid controller 808, and/or the example caliper data processor 810 is/are hereby expressly defined to include a non-transitory computer readable storage device or storage disk such as a memory, a digital versatile disk (DVD), a compact disk (CD), a Blu-ray disk, etc. including the software and/or firmware. Further still, the example drilling analysis system 800 of FIG. 8 may include one or more elements, processes and/or devices in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
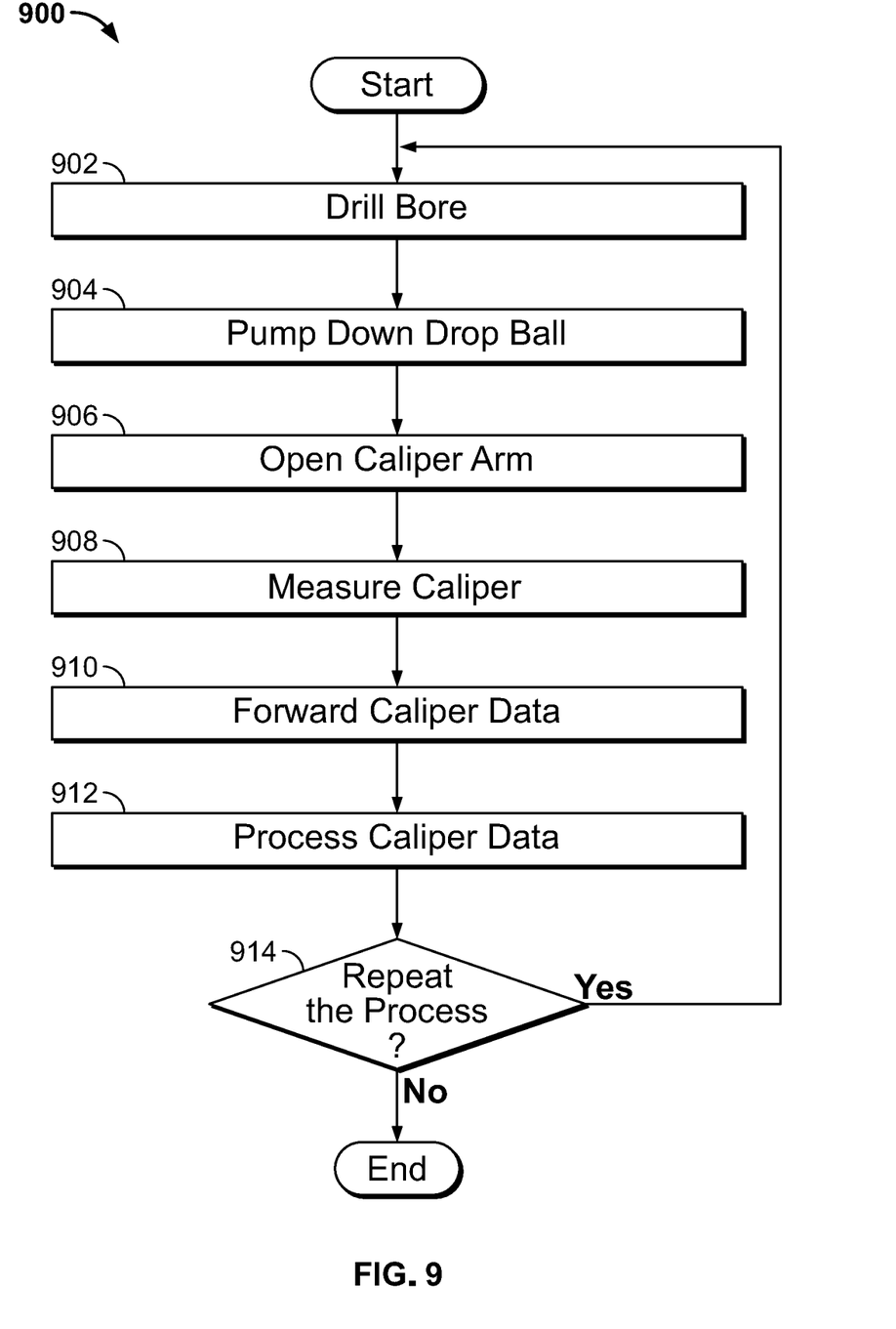
FIG. 9 is a flowchart representative of example method to implement examples disclosed herein.
Figure 10:
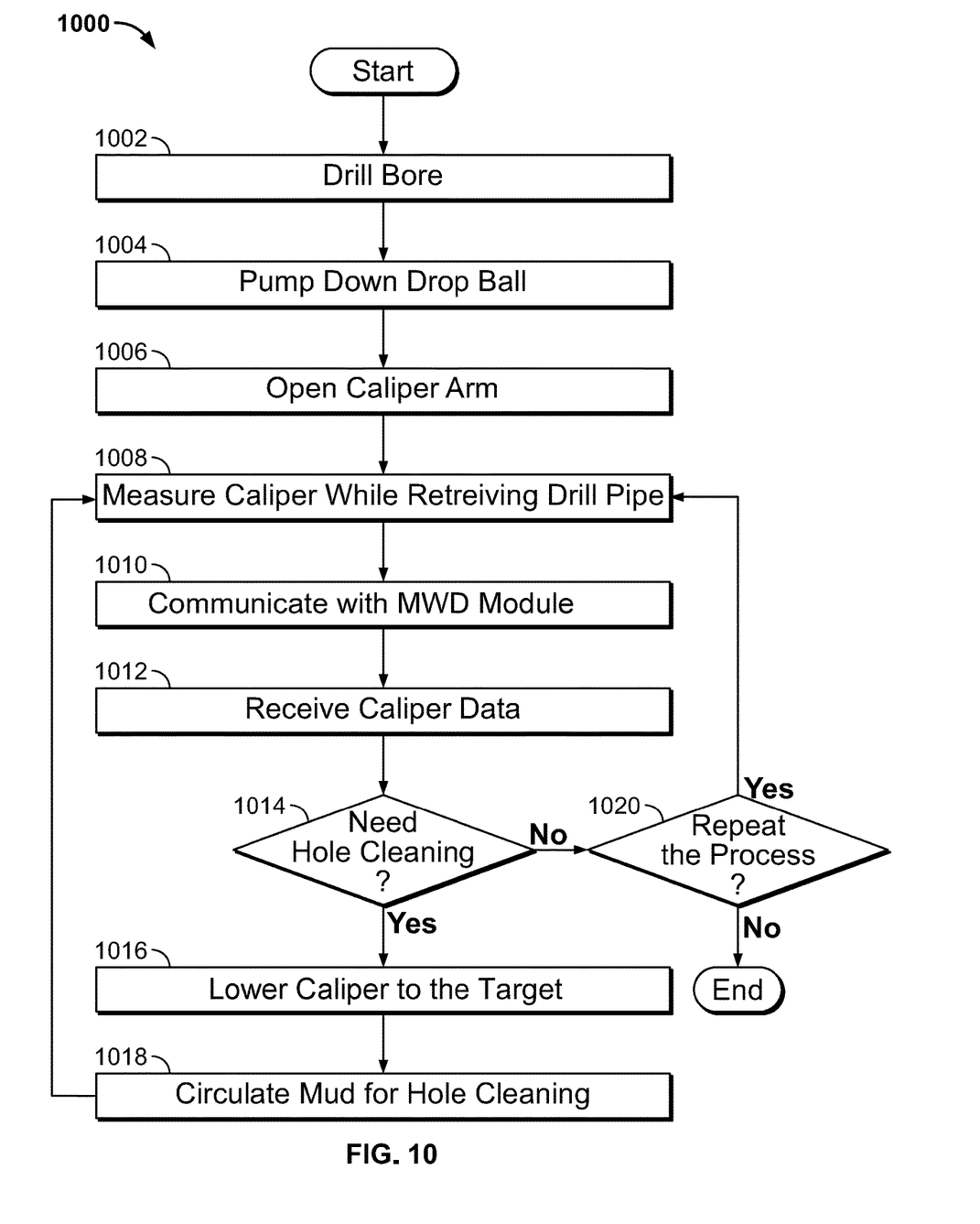
FIG. 10 is a flowchart representative of another example method to implement examples disclosed herein.

Flowcharts representative of example hardware logic, machine readable instructions, hardware implemented state machines, and/or any combination thereof for implementing the drilling analysis system 800 of FIG. 8 is shown in FIGS. 9 and 10. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 9 and 10, many other methods of implementing the example drilling analysis system 800 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9 and 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 is a flowchart representative of an example method 900 to implement examples disclosed herein. In this example a bore is to be measured and/or characterized after drilling operations.

A bore is drilled (block 902). In this example, the caliper 200 is placed into the bore after the bore has been drilled and/or pre-drilled.

According to the illustrated example a pump is caused by the fluid controller to move/push fluid that causes the drop ball 210 to be received by the sliding sleeve 208. (block 904).

The caliper arm 206 is opened and/or deployed by movement of the sliding sleeve 208 (block 906). In this example, the sliding sleeve 208 is caused to move by contact of the drop ball 210 with the sliding sleeve 208. In some examples, movement of the drop ball 210 is caused by an actuator or other movement device communicatively coupled to the caliper arm analyzer 804.

In this example, measurements are taken by the caliper 200 (block 908). For example, as the caliper 200 is moved along a length of the bore, the measurements are stored in battery-powered memory. In some examples, the measurements are taken by the caliper 200 as a drill pipe is being retrieved.

In some examples, the caliper data is forwarded by the caliper data processor 810 to the logging and control 1 (block 910). In such examples, the caliper data may be forwarded to a surface-based analyzer.

According to the illustrated example, the caliper data is processed by the caliper arm analyzer 804 to characterize the bore (block 912). In particular, dimensions, geometry, geometric profile and/or surface properties are characterized and/or calculated.

It is then determined if the process is to be repeated (block 914). If the process is to be repeated, control of the process returns to block 902. Otherwise, the process ends. This determination may be based on whether further bores are to be drilled.

FIG. 10 is a flowchart representative of another example method 1000 to implement examples disclosed herein. In this example, a bore is to be measured and/or characterized while retrieving drill pipes.

In this example, a bore is drilled (block 1002). According to the illustrated example, when the drop ball 210 is entered into the flowline (F) by the drill string 12 through the surface system, a pump controlled by the fluid controller 808 causes movement of fluid that, in turn, causes the drop ball 210 to be received by the sliding sleeve 208 (block 1004).

The caliper arm 206 is opened and/or deployed based on movement of the drop ball 210 and, in turn, movement of the sliding sleeve 208 (block 1006).

In this example, measurements are analyzed by the sliding block analyzer 806 based on data obtained from the sensor 304 as the caliper 200 is moved along a length/depth of the bore (block 1008). In some examples, the measurements are processed to indicate a borehole diameter and/or shape using a battery-powered processor along with battery-powered memory. Additionally or alternatively, the measurements are analyzed when the caliper 200 is stationary within the bore.

In some examples, communication with the MWD module 130 is initiated (block 1010). For example, mud is circulated by the fluid controller 808 to communicate with the MWD module 130. In such examples, the caliper data may be forwarded to the MWD module 130 for data transmission though mud telemetry.

According to the illustrated example, the caliper data is forwarded by the logging and control 1 and/or the caliper data processor 810 to the surface system through mud telemetry (block 1012). In particular, dimensions, geometry and/or surface properties associated with the bore are characterized and/or calculated.

It is then determined if a hole condition (e.g., of a section of the bore) necessitates cleaning by the caliper arm analyzer 804 and/or the caliper data processor 810 (block 1014). If the section is to be cleaned and/or improved, control of the process proceeds to block 1016. Otherwise, the process proceeds to block 1020. This determination may be based on whether borehole conditions need to be improved.

If it is then determined by the caliper arm analyzer 804 that the section is to be cleaned (e.g., improved to a threshold standard using mud circulation) (block 1014), at block 1016, the caliper 200 will be lowered to the target section (e.g., by connecting drill pipes).

In this example, mud is circulated at the target section via the fluid controller 808 (block 1018). In some examples, cuttings and borehole irregular sections are cleaned up by the mud circulation and control of the process then returns to block 1008.

If the process is to be repeated (block 1020), control of the process returns to block 1008. Otherwise, the process ends. This determination may be based on whether an additional borehole is to be measured and/or characterized.

Figure 11:
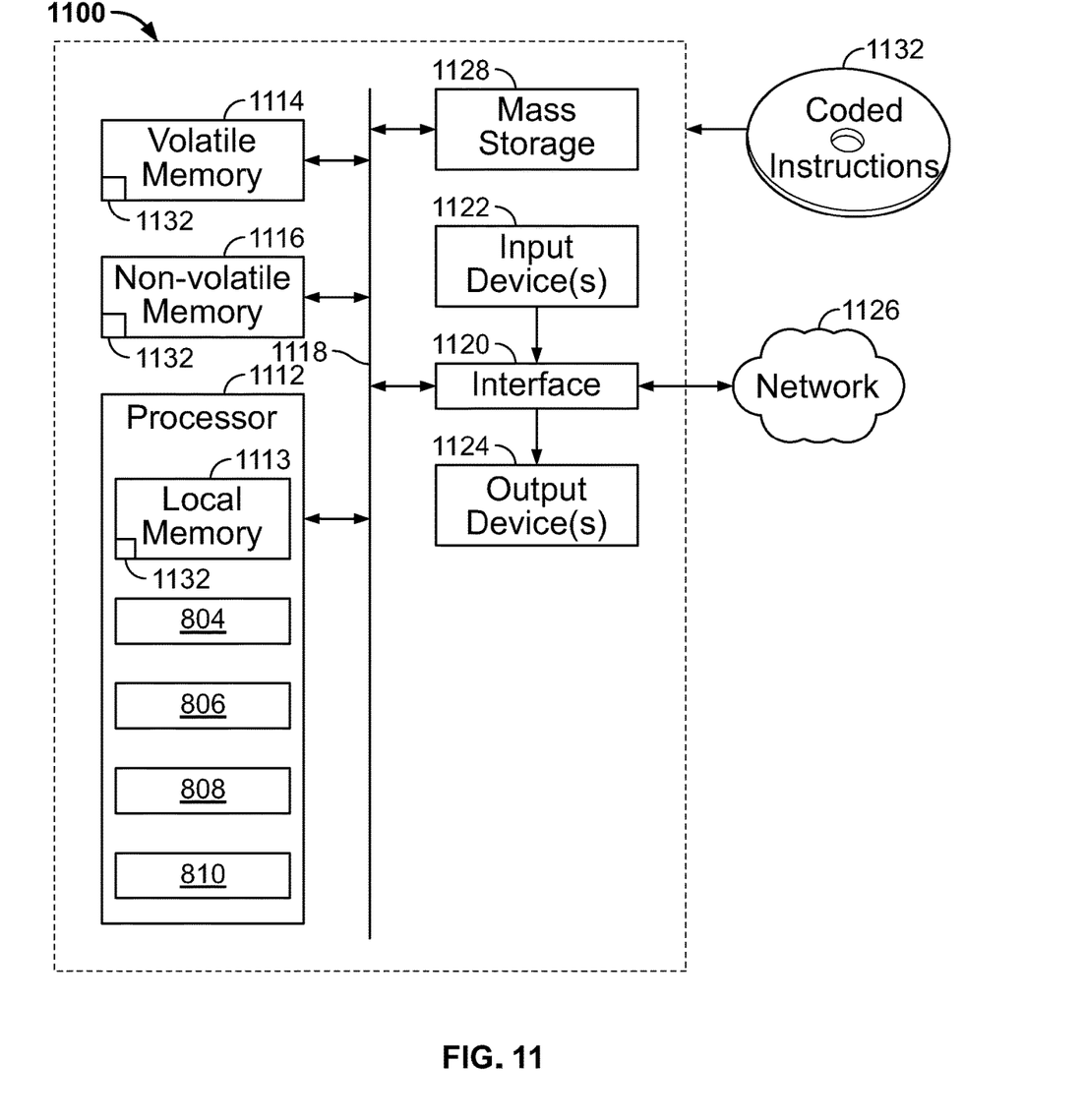
FIG. 11 is a block diagram of an example processing platform structured to execute the instructions of FIGS. 9 and 10 to implement the example analysis system of FIG. 8 and/or the example mechanical calipers shown in FIGS. 2-7B.

FIG. 11 is a block diagram of an example processor platform 1100 structured to execute the instructions of FIGS. 9 and 10 to implement the drilling analysis system 800 of FIG. 8. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example caliper arm analyzer 804, the example sliding block analyzer 806, the example fluid controller 808 and the example caliper data processor 810.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 9 and 10 may be stored in the mass storage device 1128, in the volatile memory 1114, in the non-volatile memory 1116, and/or on a removable non-transitory computer readable storage medium such as a CD or DVD.

Figure 12:
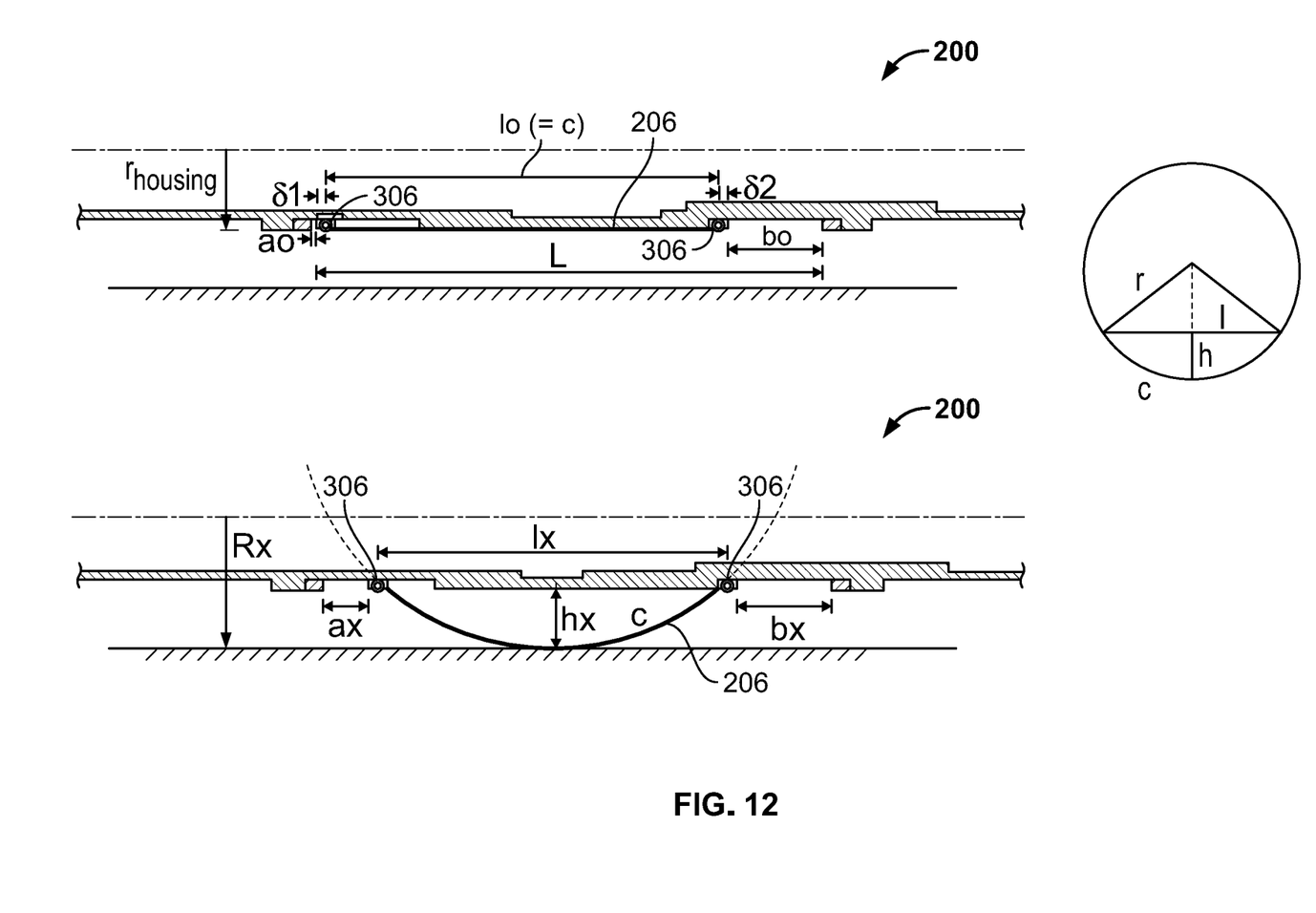
FIG. 12 illustrates an example calculation that can be implemented in examples disclosed herein.

FIG. 12 illustrates an example calculation that can be implemented in examples disclosed herein. In the illustrated example, the mechanical caliper 200 is shown in two different stages with the caliper sliding blocks 306 moved to different positions based on movement of the caliper arm 206.

Accordingly, c, r, δ1, δ2, L denoted in FIG. 12 are constants while a, b are measured variables. Therefore, l, which denotes a distance between two pivots (e.g., a chord length), can be characterized by Equation 1 below:

$$l = f(a, b, L, \delta 1, \delta 2) \qquad (1)$$

where ax, bx=measured distances, L=a distance between two sensors, and δn=an offset between a pivot and measure plane. As can be seen in FIG. 12, l can be calculated using geometric relationships. Likewise, h, which corresponds to a distance to a contact point (i.e., a contact point distance), can be calculated using geometric relationships and is expressed by Equation 2 below:

$$h = f(l,c) = f(a,b,L,\delta_1,\delta_2,c) \quad (2)$$

where c=spring length.

Further, Equation 3 below represents Rx, which is a radius from a housing center to contact point (e.g., along a single direction):

$$R_x = r_{housing} + h_x \quad (3)$$

where r=spring arc radius. For example, Rx closely corresponds to a measured bore diameter. Accordingly, a diameter/radius profile of the bore can be measured from the above. However, any appropriate type of calculation or relationship can be employed instead.

Example 1 includes an apparatus to characterize a bore. The apparatus includes a drill collar, a sliding sleeve that moves longitudinally relative to the drill collar, and a sliding block operatively coupled to the sliding sleeve and movable relative to the drill collar. The apparatus also includes a caliper arm operatively coupled to the sliding block, where the caliper arm is to displace radially outward towards an inner diameter of the bore based on movement of the sliding block, and a caliper sliding sensor to measure a movement of the sliding block.

Example 2 includes the apparatus of Example 1, and further includes a drop ball to move the sliding sleeve.

Example 3 includes the apparatus of Example 2, and further includes a push spring in contact with the sliding sleeve.

Example 4 includes the apparatus of Example 1, and further includes a lock to retain the sliding block, wherein movement of the sliding sleeve releases the lock to move the caliper arm.

Example 5 includes the apparatus of Example 1, and further includes a battery, processor, and recording device, wherein the battery is to power the processor and recording device to measure diameters of the bore as the drill collar is moved through the bore.

Example 6 includes the apparatus of Example 1, where the caliper arm includes a bow spring.

Example 7 includes the apparatus of Example 1, where the sliding sleeve is radially disposed within the drill collar.

Example 8 includes the apparatus of Example 1, where the caliper sliding sensor includes an ultrasonic pulse-echo sensor.

Example 9 includes a method including moving a caliper relative to a bore, and moving a sliding sleeve of the caliper to expand a caliper arm operatively coupled to a sliding block, where the caliper arm is to displace radially outward towards an inner diameter of the bore based on movement of the sliding block. The method also includes determining, by executing an instruction with a processor, a characteristic of the bore based on the movement of the sliding block.

Example 10 includes the method of Example 9, and further includes contacting a drop ball with the sliding sleeve.

Example 11 includes the method of Example 10, wherein the drop ball is to disengage a lock that retains the sliding block when the drop ball contacts the sliding sleeve.

Example 12 includes the method of Example 9, where determining the characteristic of the bore is based on determining a contact point distance of a bow string.

Example 13 includes the method of Example 9, and further includes recording, by executing an instruction with the processor, diameter measurements as the caliper is moved relative to the bore.

Example 14 includes the method of Example 9, and further includes controlling, by executing an instruction with the processor, a pump that provides fluid to the bore based on the determined characteristic of the bore.

Example 15 includes the method of Example 9, where the movement of the sliding block is measured by an ultrasonic pulse-echo sensor.

Example 16 includes a non-transitory machine readable medium comprising instructions, which when executed, cause a processor to at least determine a movement of a sliding block of a caliper, where the sliding block is operatively coupled to a caliper arm of the caliper, and where the caliper arm displaces radially outward towards an inner diameter of a bore based on movement of a sliding sleeve of the caliper, and calculate a condition of the bore based on the movement of the sliding block.

Example 17 includes the non-transitory machine readable medium of Example 16, where the instructions cause the processor to determine a degree of cleaning needed for the bore based on the movement of the sliding block.

Example 18 includes the non-transitory machine readable medium of Example 16, where the instructions cause the processor to direct the caliper to be moved relative to the bore.

Example 19 includes the non-transitory machine readable medium of Example 16, where the instructions cause the processor to control a pump that provides fluid to the bore based on the calculated condition.

Example 20 includes the non-transitory machine readable medium of Example 16, where the caliper arm includes a bow spring, and where the instructions cause the processor to calculate a contact point distance of a bow spring.

From the foregoing, it will be appreciated that example methods, apparatus and articles of manufacture have been disclosed that provide an accurate and cost-effective manner of measuring and/or characterizing bore characteristics, such as diameter and/or overall shape properties. In particular, examples disclosed herein can enable relatively high azimuthal resolution as well as relatively high accuracy bore measurements (e.g., within 0.1 inches).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to characterize a bore, the apparatus comprising:
   a drill collar;
   a sliding sleeve that moves longitudinally relative to the drill collar;
   a first sliding block operatively coupled to the sliding sleeve and movable relative to the drill collar;
   a second sliding block operatively coupled to the sliding sleeve and movable relative to the drill collar;
   a caliper arm having opposing ends operatively coupled to the first sliding block and the second sliding block, the caliper arm to displace radially outward towards an inner diameter of the bore based on movement of the first sliding block and the second sliding block;
   a first caliper sliding sensor to measure a first movement of the first sliding block; and a second caliper sliding sensor to measure a second movement of the second sliding block.

2. The apparatus as defined in claim 1, further including a drop ball to move the sliding sleeve.

3. The apparatus as defined in claim 2, further including a push spring in contact with the sliding sleeve.

4. The apparatus as defined in claim 1, further including a lock to retain the sliding block, wherein movement of the sliding sleeve releases the lock to move the caliper arm.

5. The apparatus as defined in claim 1, further including a battery, processor, and recording device, wherein the battery is to power the processor and recording device to measure diameters of the bore as the drill collar is moved through the bore.

6. The apparatus as defined in claim 1, wherein the caliper arm includes a bow spring.

7. The apparatus as defined in claim 1, wherein the sliding sleeve is radially disposed within the drill collar.

8. The apparatus as defined in claim 1, wherein the caliper sliding sensor includes an ultrasonic pulse-echo sensor.

9. A method comprising:
moving a caliper relative to a bore;
moving a sliding sleeve of the caliper to expand a caliper arm operatively coupled to a first sliding block and a second sliding block, the caliper arm to displace radially outward towards an inner diameter of the bore based on movement of the first sliding block and the second sliding block, wherein opposing ends of the caliper arm are operatively coupled to the first sliding block and the second sliding block; and
determining, by executing an instruction with a processor, a characteristic of the bore based on the movements of the first sliding block and the second sliding block.

10. The method as defined in claim 9, further including contacting a drop ball with the sliding sleeve.

11. The method as defined in claim 10, wherein the drop ball is to disengage a lock that retains the first sliding block when the drop ball contacts the sliding sleeve.

12. The method as defined in claim 9, wherein determining the characteristic of the bore is based on determining a contact point distance of a bow spring.

13. The method as defined in claim 9, further including recording, by executing an instruction with the processor, diameter measurements as the caliper is moved relative to the bore.

14. The method as defined in claim 9, further including controlling, by executing an instruction with the processor, a pump that provides fluid to the bore based on the determined characteristic of the bore.

15. The method as defined in claim 9, wherein the movement of the first sliding block is measured by a first ultrasonic pulse-echo sensor, and the movement of the second sliding block is measured by a second ultrasonic pulse-echo sensor.

16. A non-transitory machine readable medium comprising instructions, which when executed, cause a processor to at least:
determine a movement of a sliding block of a caliper, the sliding block operatively coupled to a caliper arm of the caliper, wherein the caliper arm displaces radially outward towards an inner diameter of a bore based on movement of a sliding sleeve of the caliper;
calculate a condition of the bore based on the movement of the sliding block; and
determine a degree of cleaning needed for the bore based on the movement of the sliding block.

17. The non-transitory machine readable medium as defined in claim 16, wherein the caliper arm includes a bow spring, and wherein the instructions cause the processor to calculate a contact point distance of a bow spring.

18. The non-transitory machine readable medium as defined in claim 16, wherein the instructions cause the processor to direct the caliper to be moved relative to the bore.

19. The non-transitory machine readable medium as defined in claim 16, wherein the instructions cause the processor to control a pump that provides fluid to the bore based on the calculated condition.

20. The non-transitory machine readable medium as defined in claim 16, wherein the instructions cause the processor to determine a movement of a second sliding block of the caliper, wherein a first end of the caliper arm is operatively coupled to the sliding block and an opposing second end of the caliper arm is operatively coupled to the second sliding block, wherein the instructions cause the processor to calculate the condition of the bore based on the movements of the sliding block and the second sliding block.

* * * * *